Oct. 1, 1963     L. M. PUSTER ETAL     3,105,637
TEMPERATURE RESPONSIVE SNAP-ACTING VALVE
Filed Feb. 15, 1961

United States Patent Office 3,105,637
Patented Oct. 1, 1963

3,105,637
TEMPERATURE RESPONSIVE SNAP-ACTING VALVE
Louis M. Puster and Joseph P. Wagner, Knoxville, Tenn., assignors to Robertshaw Controls Company, a corporation of Delaware
Filed Feb. 15, 1961, Ser. No. 89,382
2 Claims. (Cl. 236—48)

This invention relates to temperature responsive devices for controlling a variable temperature condition.

It is an object of this invention to monitor a variable temperature condition continuously and to warn of impending unsafe variations of the condition.

Another object of this invention to monitor a variable temperature in a medium whereby a pressure signal will automatically respond when the temperature exceeds normal operating limits.

A further object of this invention is to monitor a temperature variable in a system so that if the variable exceeds a safe limit, pressure will be vented automatically from the system effecting a warning signal or a shutdown of the system.

Still another object of this invention is to produce a warning signal when the device develops a leak so that it can no longer respond to a temperature change.

These and other objects will become apparent from the following description taken in connection with the accompanying drawings, wherein.

Figure 1:
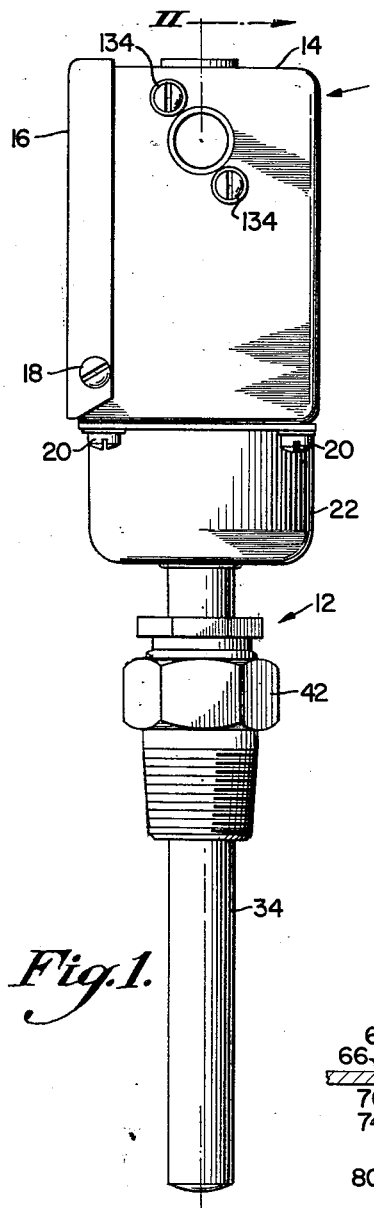
FIG. 1 is a side elevational view of the device.

Referring to the drawings, the invention comprises a transmitter assembly 10 and a thermally responsive system 12. Transmitter assembly 10 includes a casing 14 which is open at one side. A cover 16 is removably attached to casing 14 by screws 18 to close the open side of casing 14. The thermally responsive system 12 is attached to casing 14 by means of screws 20.

Figure 2:
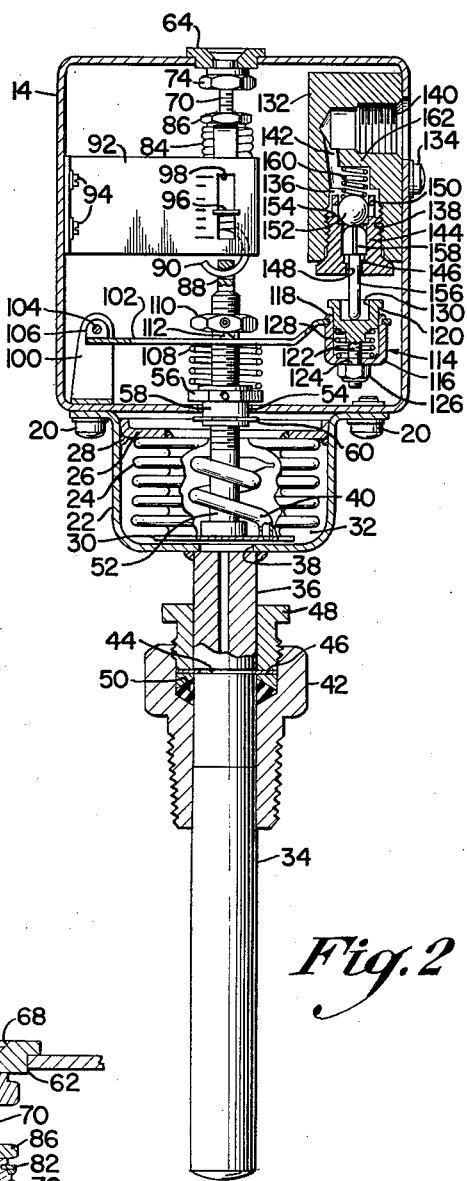
FIG. 2 is a sectional view taken along the line II—II of FIG. 1.

Referring now to FIG. 2, the thermally responsive system 12 comprises a cup-shaped housing 22 having a bellows 24 mounted therein. Bellows 24 is attached to the top of cup-shaped housing 22 by means of a bellows head 26 which is joined to housing 22 by conventional means, such as welding, as shown at 28. Bellows 24 is provided with a bottom wall 30 which is free to move. Bellows 24 and the inner wall of housing 22 define a chamber 32.

A temperature sensing bulb 34 has an extension 36 which is attached to the bottom wall of housing 22. An aperture 38 in the bottom wall of housing 22 provides communication between temperature sensing bulb 34 and chamber 32. A filling tube 40 is mounted inside bellows 24 to bottom wall 30 for charging the system. Bellows 24, chamber 32, and bulb 34 constitute a closed system whereby the vapor pressure developed by the charge in bulb 34 will be transmitted to chamber 32 and thereby act on bellows 24. Accordingly, a variation of temperature sensed by bulb 34 produces a corresponding expansion or contraction of bellows 24. The thermal system is evacuated and charged to operate the transmitter with vapor pressure below atmospheric pressure.

An externally threaded bushing 42 is mounted on bulb 34 and extension 36 to provide a means for mounting the device in a wall of the container of the medium to be monitored. Extension 36 has a groove 44 for receiving a snap-ring 46. A bushing nut 48 is threadedly engaged with bushing 42 and bears against snap-ring 46 to prevent the device from being blown out of its mounting by pressure. Sealing means 50 is provided in the cavity of bushing 42 forming a fluid-tight seal between extension 36 and bushing 42.

Connected with movable wall 30 of bellows 24 is an actuator 52 which projects into the interior of casing 14 through an aperture 54 in the bottom wall of casing 14. Threaded onto actuator 52 is a stop nut 56 having a cylindrical boss 58 projecting therefrom through aperture 54. Boss 58 is provided with an annular groove for receiving a snap-ring 60. Stop nut 56 limits the downward movement of actuator 52 by engagement with the inside bottom wall of casing 14. Snap-ring 60 limits upward movement of actuator 52 by engagement with the outside bottom wall of casing 14. Thus, damage to bellows 24 due to overtravel is prevented by the described limit stops.

Figure 3:
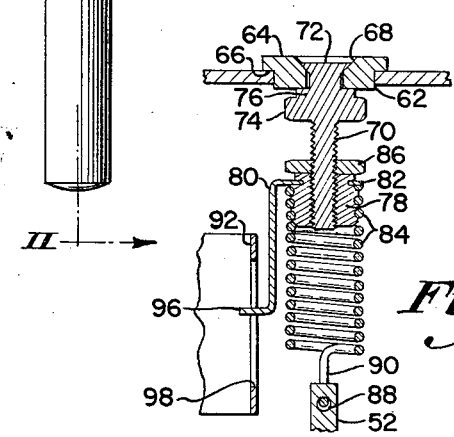
FIG. 3 is an enlarged sectional view of a detail of the invention.

Referring to FIG. 3, opening 62 is provided in the upper wall of casing 14 in alignment with aperture 54. A bushing 64, having a shoulder 66, is received in opening 62. A countersunk hole 68 is provided through bushing 64. Loosely mounted in hole 68 is a range adjustment screw 70. A portion 72 of range screw 70 loosely projects through hole 68 and is loosely staked to the countersunk portion of hole 68. A hex head 74 on range screw 70 has a circular shoulder 76 projecting therefrom which locates range screw 70 against the lower portion of bushing 64. The loose mounting of range screw 70 in hole 68 enables it to turn freely in hole 68 when hex head 74 is engaged by the appropriate tool.

A range adjustment nut 78 is threaded onto range screw 70. A pointer support 80 has a portion 82 which is firmly staked to adjustment nut 78. A range spring 84 is mounted on adjusting nut 78 by means of external threads on adjusting nut 78 having the same pitch as the lead on the helical coils of range spring 84. A lock nut 86 serves to prevent undesired rotation of range screw 70. The upper end of actuator 52 is provided with a transverse opening 88 which receives the lower end 90 of range spring 84.

A scale plate 92 is mounted in casing 14 by screws 94. A pointer 96 on support 80 projects through a slot 98 in scale plate 92. Nut 78 is prevented from rotation by the engagement of pointer 96 with the edges of slot 98. The scale plate 92 is appropriately marked adjacent the slot 98 to provide an indicating means. Cover 16 can be easily removed to permit observation of the scale plate.

Mounted on the bottom inner wall of casing 14 is a U-shaped support bracket 100. A lever 102 is pivotally mounted on the arms of bracket 100 by pin 104 which projects through a pair of ears 106 on lever 102. Actuator 52 loosely projects through an opening in the central portion of lever 102. A spring 108 encircles actuator 52 and has one end seated against the underside of lever 102 and the other end seated on stop nut 56. A nut 110 is threaded onto the upper portion of actuator 52 and a pair of upwardly projecting knife-edge pivots 112 on lever 102 bear against the underside of nut 110. Spring 108 biases pivots 112 into engagement with nut 110 as actuator 52 travels axially in the casing. Axial movement of actuator 52 causes lever 102 to pivot with respect to bracket 100 about pin 104 and with respect to nut 110 about pivots 112.

Attached to the outer end of lever 102 is a differential assembly 114. Differential assembly 114 comprises a cup-shaped housing 116 having a shoulder 118 on the upper wall thereof to which lever 102 is securely staked. A plunger member 120 has a threaded stem 122 which loosely projects through an aperture 124 in the bottom wall of housing 116. A nut 126 is threaded onto stem 122 to secure the parts together and also provides a means for adjusting the compression on a differential spring 128. Differential spring 128 is mounted in housing 116 with its lower end seated against the bottom wall of the housing and its upper end seated against member 120. A cylindrical recess 130 is formed in the upper wall of plunger 120 for receiving a valve operating stem 156. Differential assembly 114 serves as a snap-acting device in a manner to be described below.

A valve body or casing 132 is mounted on one wall of casing 14 by screws 134. A chamber 136 is formed in body 132 and communicates with an internally threaded opening 138 in the lower end of body 132. An internally threaded inlet opening 140 is formed in an upper portion of body 132 and is connected with chamber 136 by a passage 142. A valve seat member 144 is threadedly received in opening 138.

Valve seat member 144 is provided with a passage 146 having a reduced opening 148 at the lower end forming a shoulder. Projecting from the upper end of member 144 into chamber 136 is a cylindrical sleeve extension 150 having a common axis with passage 146. The inner diameter of sleeve extension 150 is larger than the diameter of passage 146.

A poppet valve 152 in the form of a ball is received in sleeve extension 150 and seats on the shoulder formed by the junction of passage 146 with the internal opening of sleeve 150. Valve 152 is closely guided by the inner wall of sleeve 150. Transverse openings 154 are drilled in the wall of sleeve 150 to allow fluid to flow freely into passage 146 when valve 152 is unseated.

A valve operating stem 156 has an upper non-circular portion 158 received in passage 146. Non-circular portion 158 is closely guided by the wall of passage 146 and, being larger than reduced opening 148, serves to retain stem 156 in passage 146. The space between the flat walls of portion 158 and the circular walls of passage 146 allows fluid to flow freely through passage 146. The lower portion of stem 156 projects loosely through opening 148 with sufficient clearance to allow fluid to flow freely through opening 148.

A return spring 160 has one end seated against valve 152 and the other end seated against a wall 162 in the chamber 136. Return spring 160 biases valve 152 against its seat over passage 146. Thus, when pressure is supplied to chamber 136 from inlet opening 140 through passage 142, valve 152 is biased against its seat by both the fluid pressure in chamber 136 and return spring 160.

As stated above, chamber 32 is evacuated to a pressure below atmospheric pressure. Accordingly, atmospheric pressure inside bellows 24 urges wall 30 to its lowermost position. This force, exerted by atmospheric pressure, places range spring 84 in tension. Therefore, if a leak should occur in the thermal system causing a loss of vacuum, range spring 84 will retreat and move actuator 52 and wall 30 upwardly.

In operation, lock nut 86 is loosened and the desired tension on range spring 84 is set by rotation of range screw 70. Rotation of range screw 70 causes adjusting nut 78 to move vertically since it is prevented from rotating with range screw 70 by engagement of pointer 96 with slot 98. The device is then mounted into the manifold or container of the medium to be monitored by bushing 42.

Upon an increase in temperature of bulb 34, the vapor pressure developed by the charge is increased. The increasing pressure in chamber 32 and the force exerted by range spring 84 causes bellows 24 to contract, which moves actuator 52 upwardly. Upward movement of actuator 52 causes lever 102 to rotate in a counterclockwise manner. The specific temperature at which lever 102 begins to rotate is adjusted by the amount of force that is exerted by range spring 84. The counterclockwise movement of lever 102 moves differential assembly 114 upward until valve operating stem 156 is received in recess 130 of plunger member 120.

Pressure is supplied to chamber 136 in valve body 132 through inlet 140. With valve 152 seated due to the bias of spring 160 and with chamber 136 pressurized, the resulting pressure drop across valve 152 exerts an additional closing force on valve 152 to that exerted by spring 160. Thus, valve 152 is held against its seat by both the pressure in chamber 136 and spring 160.

Continued upward movement of differential assembly 114 causes differential spring 128 to contract against the combined force on valve 152 exerted by spring 160 and the pressure in chamber 136. Differential spring 128 continues to contract to the point where it exerts a force equal to the closing force on valve 152. When this occurs, further upward movement of the differential assembly unseats valve 152.

As soon as valve 152 is unseated, the fluid pressure acting upon it is equalized, thus reducing the closing force to that exerted by spring 160. This sudden reduction of force against differential spring 128 causes it to expand suddenly and snap valve 152 to the fully open position and the pressure in chamber 136 is vented through opening 148.

Should the temperature of bulb 34 continue to rise after valve 152 has been unseated, actuator 52 will continue to move upwardly until snap-ring 60 engages the bottom wall of casing 14 due to overtravel. If valve 152 reaches the limit of its travel before snap-ring 60 engages casing 14 to stop the travel of actuator 52, spring 108 acts as an overrun spring and contracts, thereby preventing damage to the valve assembly, differential assembly, and lever 102.

With a decrease in the monitored temperature at bulb 34, the pressure in chamber 32 will correspondingly decrease, causing lever 102 to rotate clockwise about its pivot until valve 152 returns to its seat. However, since differential spring 128 has returned member 120 to its original extended position, it is necessary for the monitored temperature to drop to a safe level in order for lever 102 to rotate past the position at which valve 152 opened before it can return to its seat. Therefore, the limits between which the lever can travel between the valve opening and the valve closing positions and the magnitude of the monitored temperature differential is adjustable by means of nut 126. Thus, if a large differential in the monitored temperature is desired, nut 126 is adjusted to allow spring 128 to expand so that a large lever travel will be required to unseat valve 152. Conversely, if it is desired to maintain the monitored temperature within narrow limits, nut 126 is adjusted to contract differential spring 128 so that the force required to unseat valve 152 will be built up with a small amount of lever travel.

The fail-safe feature of the device operates as follows: Since chamber 32 is evacuated to a pressure less than atmospheric pressure under normal conditions, the atmospheric pressure acting on the other side of bellows 24 exerts a force on bellows 24 which places range spring 84 in tension. Should a leak develop in the thermal system, the pressure acting on both sides of bellows 24 would be equalized. Accordingly, range spring 84 is adjusted so that when there is no vacuum in chamber 32, spring 84 will move actuator 52 upwardly to a position where differential assembly 114 causes valve 152 to unseat and vent the pressure in chamber 136, regardless of the temperature of bulb 34. Thus, the system pressure is vented to produce a warning signal both by an abnormal temperature and a failure of the thermal system.

While a specific construction has been described, it will be readily apparent that various modifications and alterations can be made in the device without departing from the scope of the invention as defined in the appended claims.

We claim:

1. A temperature responsive device comprising a casing, a valve body mounted in said casing and having a fluid flow passage extending therethrough from a fluid inlet to a fluid outlet, check valve means in said passage having a valve seat facing said inlet and a valve member normally maintained in a closed position against said seat by fluid pressure at said inlet, said valve member being movable from said closed positon to an open position spaced from said seat to open said passage to the flow of fluid therethrough with the fluid pressure substantially equalized across said valve member, first spring means in said valve body biassing said valve member toward said valve seat, a plunger slideably mounted in said valve body and operable upon movement in a first direction to move said valve member from said closed position to said open position, a lever pivotally supported at one end on said casing, temperature responsive means in said casing, means coupling said temperature responsive means to said lever at a location intermediate the ends of said lever for pivoting said lever relative to said casing in response to variations in temperature, said means coupling said temperature responsive means to said lever comprising a threaded shaft on said temperature responsive means axially movable in response to variations in temperature, a first nut threadably received upon said shaft, means on one side of said lever engageable with said first nut, a second nut threadably received upon said shaft at a location spaced from the opposite side of said lever, and an overshoot spring resiliently engaged in compression between said second nut and said other side of said lever, second spring means mounted on the other end of said lever for engagement with said plunger and operable when engaged with said plunger to exert a resilient biassing force urging said plunger in said first direction, the resilient biassing force exerted on said plunger by said second spring means being variable in dependence upon the pivotal position of said lever relative to said casing and being operable at a pivotal position of said lever corresponding to a predetermined temperature to overcome the fluid pressure force and biassing force of said first spring means to move said valve member to said open position.

2. A temperature responsive device as defined in claim 1 further comprising a range spring coupled in tension between said threaded shaft and said casing to exert a resilient biasing force on said shaft urging said second nut toward said other side of said lever.

References Cited in the file of this patent
UNITED STATES PATENTS

| | | |
|---|---|---|
| 1,093,771 | Ellis | Apr. 21, 1914 |
| 1,109,996 | Kuhlmann | Sept. 8, 1914 |
| 1,593,170 | Giesler | July 20, 1926 |
| 1,845,027 | Lonergan | Feb. 16, 1932 |
| 2,003,947 | McKinley | June 4, 1935 |
| 2,129,937 | Johnson | Sept. 13, 1938 |
| 2,584,419 | Branson | Feb. 5, 1952 |
| 2,643,676 | Curran | June 30, 1953 |